(12) United States Patent
Takezawa et al.

(10) Patent No.: US 10,641,425 B2
(45) Date of Patent: May 5, 2020

(54) DEPRESSURIZER

(71) Applicant: Tatsuno Corporation, Tokyo (JP)

(72) Inventors: Masahiro Takezawa, Tokyo (JP); Yuki Terasoma, Tokyo (JP); Kiyoshi Kimura, Tokyo (JP)

(73) Assignee: TATSUNO CORPORATION, Tokyo (JP)

( * ) Notice: Subject to any disclaimer, the term of this patent is extended or adjusted under 35 U.S.C. 154(b) by 56 days.

(21) Appl. No.: 15/835,145

(22) Filed: Dec. 7, 2017

(65) Prior Publication Data

US 2018/0163928 A1 Jun. 14, 2018

(30) Foreign Application Priority Data

Dec. 12, 2016 (JP) ................. 2016-240321

(51) Int. Cl.
*F16L 55/07* (2006.01)
*F16K 1/38* (2006.01)
(Continued)

(52) U.S. Cl.
CPC ............ *F16L 55/07* (2013.01); *B67D 7/3218* (2013.01); *F16K 1/04* (2013.01); *F16K 1/385* (2013.01); *F16K 24/04* (2013.01); *F16L 55/1108* (2013.01); *F17C 1/00* (2013.01); *F17C 5/007* (2013.01); *F17C 5/06* (2013.01); *F17C 13/002* (2013.01); *F17C 13/12* (2013.01); *F16L 41/16* (2013.01); *F16L 55/005* (2013.01); *F16L 55/1007* (2013.01); *F16L 55/1015* (2013.01);
(Continued)

(58) Field of Classification Search
CPC .... F16K 1/50; F16K 5/00; F16K 24/04; F16L 55/1108; F16L 55/07
See application file for complete search history.

(56) References Cited

U.S. PATENT DOCUMENTS 1,859,251 A 5/1932 Brown
4,921,281 A * 5/1990 Taylor ................. F16L 55/1108
285/90
(Continued)

FOREIGN PATENT DOCUMENTS

GB 2033550 A 5/1980
JP H0450800 U 4/1992
(Continued)

*Primary Examiner* — Timothy P. Kelly
(74) *Attorney, Agent, or Firm* — Stetina Brunda Garred and Brucker; Mark B. Garred

(57) ABSTRACT

To provide a depressurizer with a function of depressurizing a filling hose separated from a filling device when a safety device (safety joint) operates (separates). A depressurizers (10, 11) according to the present invention are mounted to a filling hose (21) for filling hydrogen from a hydrogen filling apparatus (100) to a vehicle. In the present invention, it is preferable that on a main body portion (1) of the depressurizers (10, 11) is formed a depressurizing communication hole (1B) communicating with a hydrogen gas passage (1A); a plug (2) that can be inserted into the depressurizing communication hole (1B) is mounted; and on the depressurizing communication hole (1B) and the plug (2) are formed tapered portions (a pin tapered portion 2B of the plug 2 and a tapered portion 1BB of the depressurizing communication hole 1B) with complementary shapes.

9 Claims, 5 Drawing Sheets

(51) Int. Cl.
*B67D 7/32* (2010.01)
*F16K 1/04* (2006.01)
*F17C 1/00* (2006.01)
*F16L 55/11* (2006.01)
*F16K 24/04* (2006.01)
*F17C 5/00* (2006.01)
*F17C 5/06* (2006.01)
*F17C 13/00* (2006.01)
*F17C 13/12* (2006.01)
*F16L 55/00* (2006.01)
*F16L 55/10* (2006.01)
*F16L 41/16* (2006.01)

(52) U.S. Cl.
CPC ............... *F17C 2205/037* (2013.01); *F17C 2205/0332* (2013.01); *F17C 2205/0338* (2013.01); *F17C 2205/0364* (2013.01); *F17C 2205/0382* (2013.01); *F17C 2221/012* (2013.01); *F17C 2223/0123* (2013.01); *F17C 2265/065* (2013.01); *F17C 2270/0139* (2013.01); *F17C 2270/0178* (2013.01)

(56) References Cited

U.S. PATENT DOCUMENTS

| | | | |
|---|---|---|---|
| 6,810,925 B2 * | 11/2004 | Graham | B60S 5/02 141/18 |
| 9,446,821 B1 * | 9/2016 | Mohrfeld | B63B 13/00 |
| 2006/0207656 A1 | 9/2006 | Takahashi | |
| 2008/0202596 A1 * | 8/2008 | Kato | F01P 11/028 137/197 |
| 2010/0319794 A1 * | 12/2010 | Ward | F16K 24/04 137/596 |

FOREIGN PATENT DOCUMENTS

| | | |
|---|---|---|
| JP | 2000130675 A | 5/2000 |
| JP | 2010078027 A | 4/2010 |
| JP | 2014109350 A | 6/2014 |

\* cited by examiner

[Fig 1]
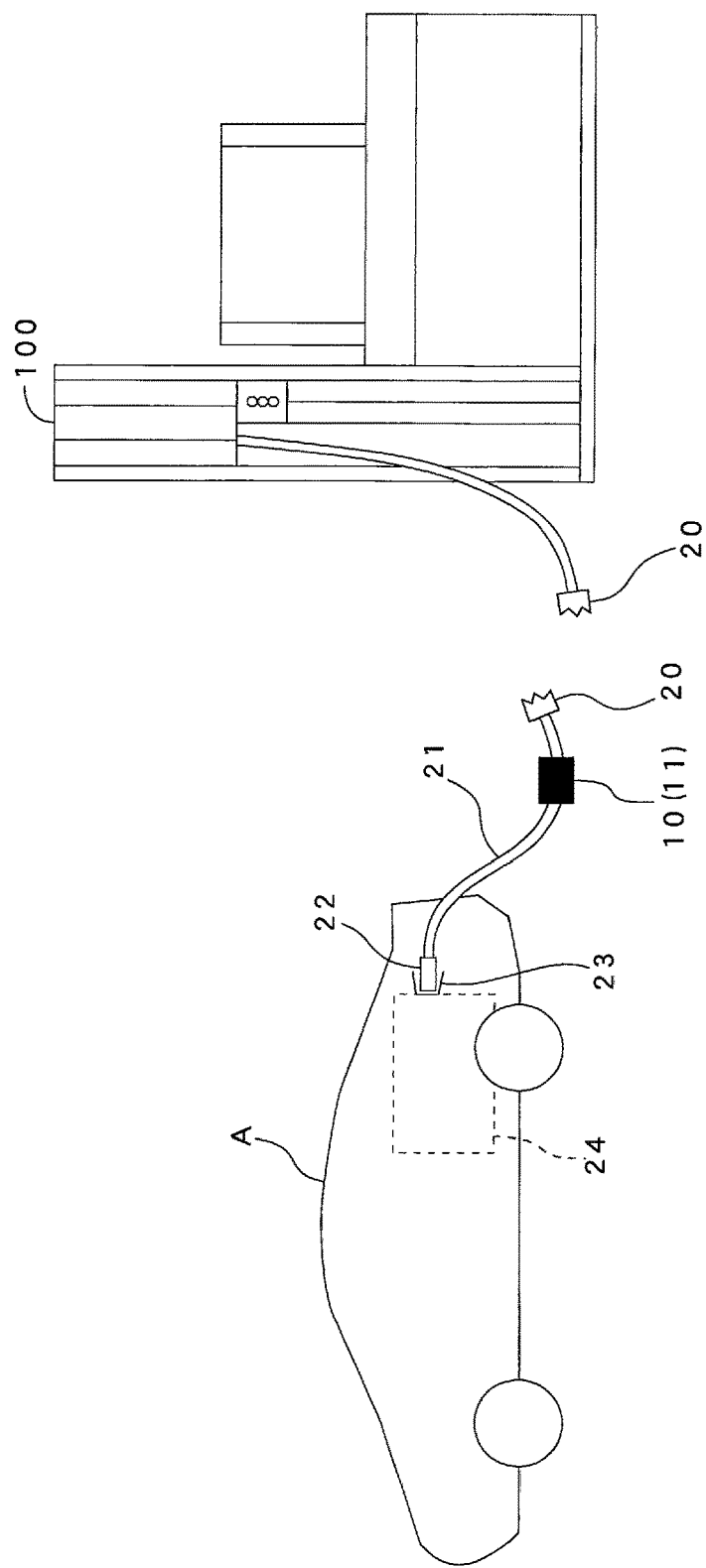

[Fig. 2]
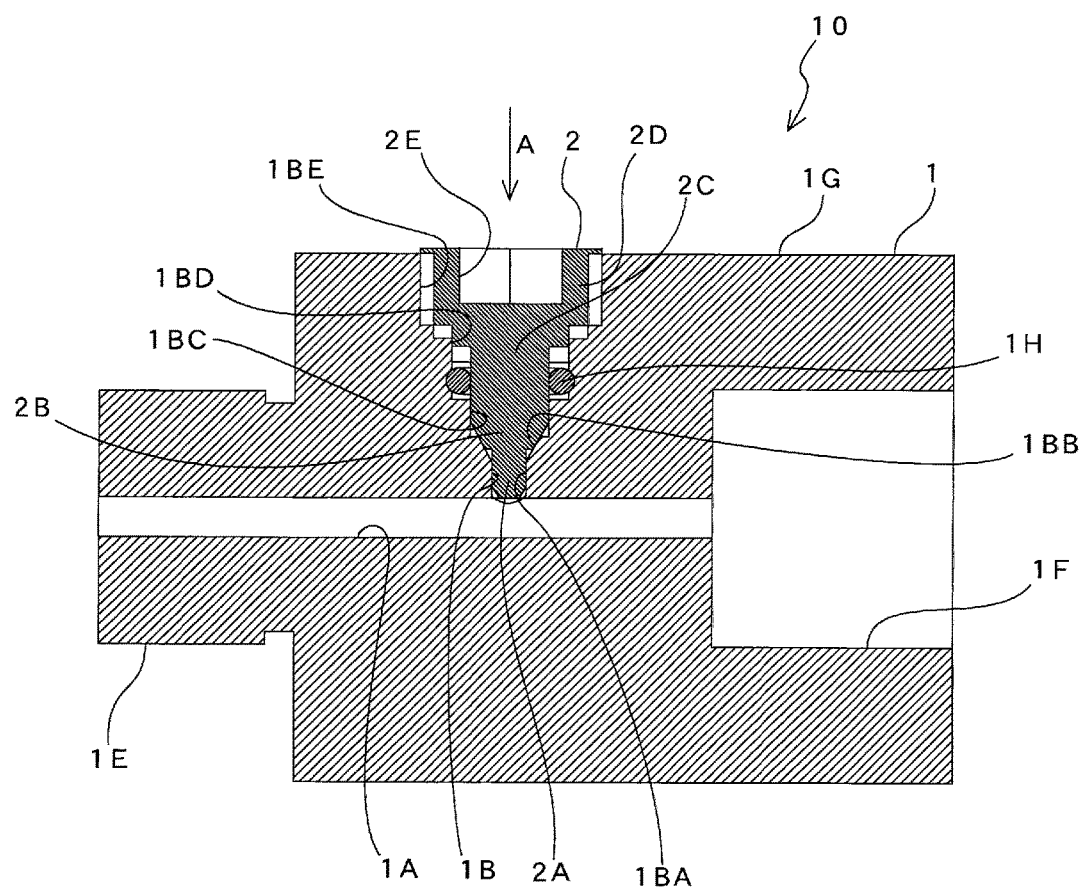

[Fig. 3]
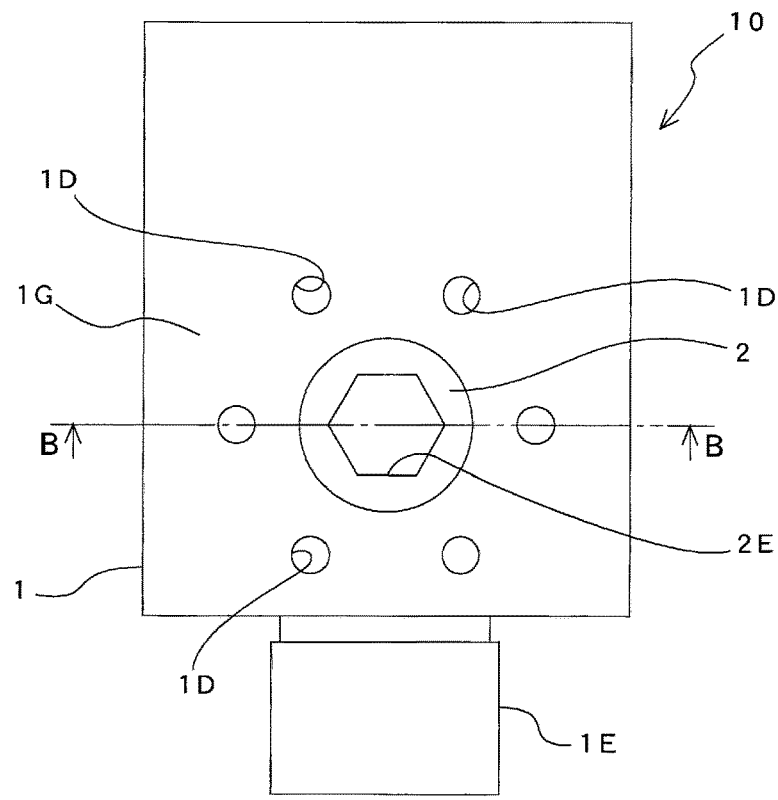
[Fig. 4]
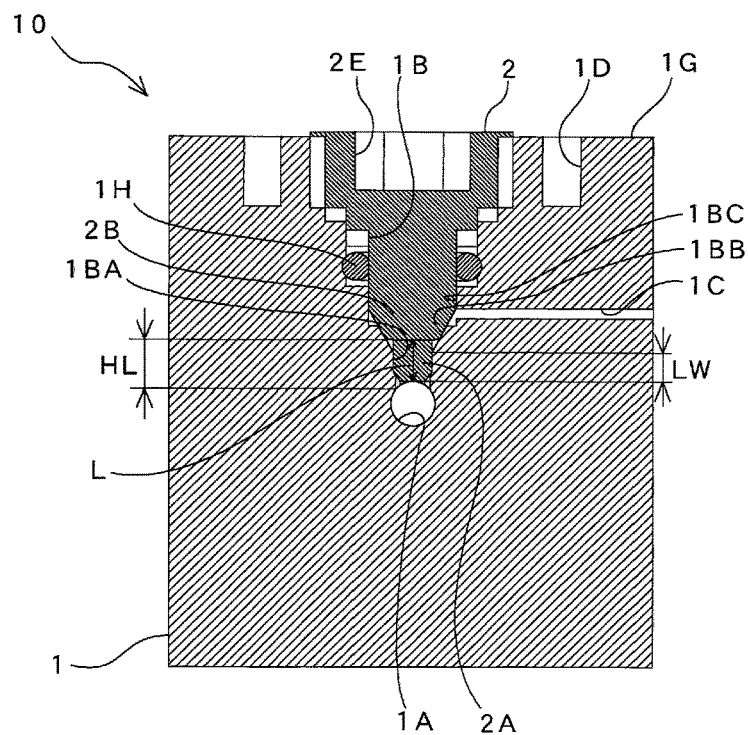

[Fig. 5]
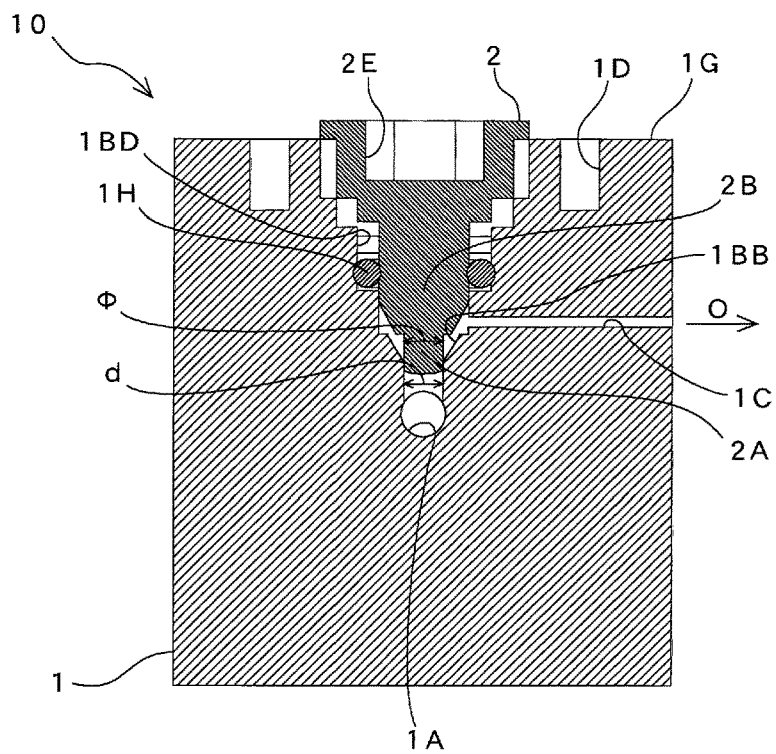
[Fig. 6]
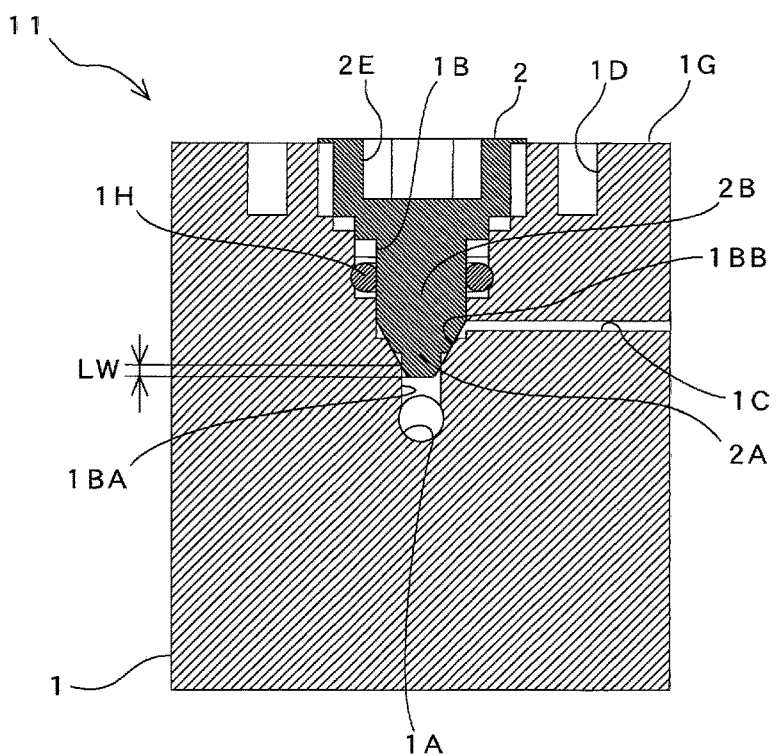

[Fig. 7]
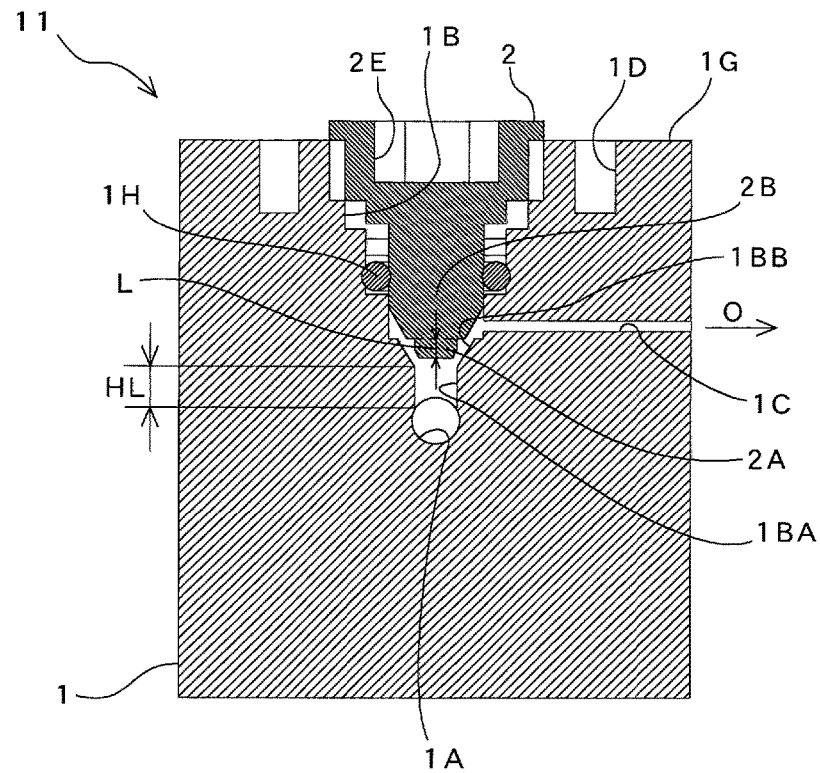
[Fig. 8]
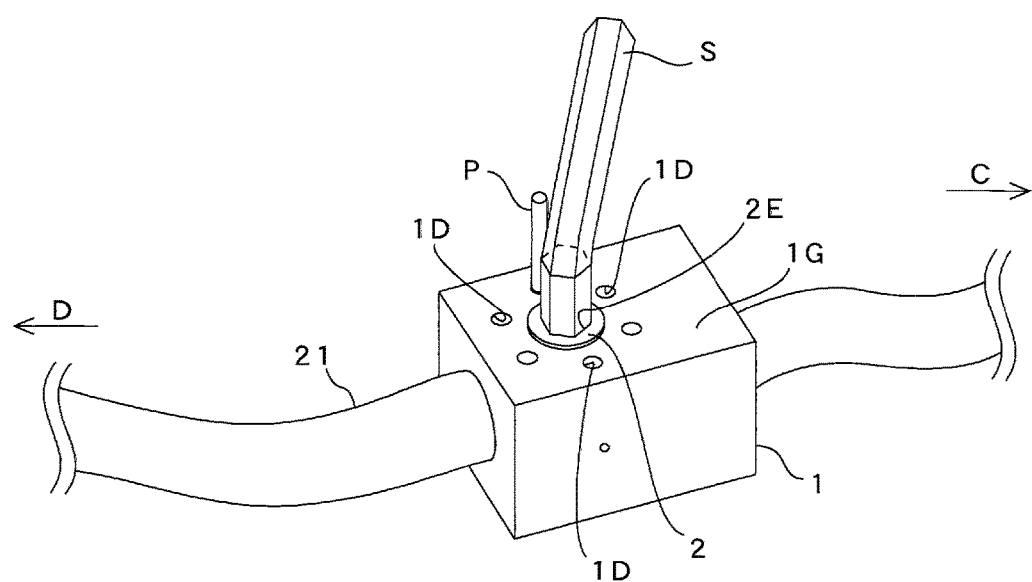

DEPRESSURIZER

CROSS-REFERENCE TO RELATED APPLICATIONS

The present application claims priority to Japanese Patent Application No. 2016-240321 filed on Dec. 12, 2016, the disclosure of which is incorporated herein by reference.

STATEMENT RE: FEDERALLY SPONSORED RESEARCH/DEVELOPMENT

Not Applicable

BACKGROUND

1. Field of the Invention

The present invention relates to a depressurizing mechanism for flowing out high pressure gas (hydrogen for instance) from a piping (a filling hose mounted on a hydrogen filling apparatus, for instance) at a small flow rate.

2. Description of the Related Art

For example, to a vehicle using hydrogen gas as fuel, at a hydrogen filling station with a hydrogen filling apparatus is filled hydrogen after a filling nozzle and a vehicle side filling port (receptacle) are connected with each other. To the hydrogen filling apparatus is connected a filling hose having the filling nozzle at its end. Here, the filling by the hydrogen filling apparatus is performed while being controlled depending on the maximum using pressure of a hydrogen tank mounted in a vehicle. The applicant has proposed a hydrogen filling apparatus (refer to Japanese patent publication No. 2014-109350 gazette, for example), and the device is effective.

In the hydrogen filling station, when a vehicle runs to pull the filling hose while hydrogen is filled, the hydrogen filling apparatus falls, and devices are broken to inject hydrogen gas, so that it becomes dangerous condition. Then, a safety joint that separates when a tensile load more than a predetermined value is applied to the filling hose is mounted to divide the filling hose and the filling nozzle from the hydrogen filling apparatus, which prevents the hydrogen filling apparatus from falling and the devices from being broken. Here, when the safety joint separates, a shut-off valve in the safety joint immediately works to prevent hydrogen from being injected from the divided portions of the safety joint. In addition, on the hydrogen filling apparatus main body side is mounted a depressurizing mechanism, so that when the safety joint separates, high pressure gas is prevented from being rapidly injected.

However, in the conventional technique is not mounted the depressurizing mechanism on the filling nozzle or the filling hose. Then, when the safety joint works (separates), high pressure hydrogen gas cannot be removed from the filling hose on the vehicle side from the safety joint, so that a condition that high pressure hydrogen gas is filled in the filling hose is maintained. Under the condition, when the filling hose is dragged by a vehicle and a hole is formed on the filling hose, from the hole injects high pressure hydrogen gas, and due to momentum of the injection, the filling hose moves around (the filling hose becomes uncontrollable), which may damage a person and a vehicle. Therefore, it has been desired to develop a mechanism for removing high pressure hydrogen gas from the filling hose (for depressurizing the filling hose) after the safety joint works (separates) at a small flow rate, such depressurizing mechanism has not been proposed yet.

SUMMARY

The present invention has been made in consideration of the above problems in the prior art, and the object thereof is to provide a depressurizer with a function of depressurizing a filling hose that is divided from a filling device when a safety device (or a safety joint) works (separates).

Depressurizers (10, 11) according to the present invention are characterized by being mounted to a filling hose (21) for filling hydrogen from a hydrogen filling apparatus (100) to a vehicle A.

It is preferable that the depressurizers (10, 11) according to the present invention include: a main body portion (1) in which a hydrogen gas passage (1A) is formed, the main body portion (1) made of metal; a depressurizing communication hole (1B) formed in the main body portion (1), the depressurizing communication hole (1B) communicating with the hydrogen gas passage (1A); and a plug (2) capable of being inserted into the depressurizing communication hole (1B), the plug (2) made of metal, wherein tapered portions (a pin tapered portion 2B of the plug (2), and a tapered portion 1BB of the depressurizing communication hole (1B)) with complementary shapes are formed on the depressurizing communication hole (1B) and the plug (2). In addition, in the present invention, it is preferable that the depressurizers (10, 11) further include a relief circuit (1C) formed in the main body portion (1), the relief circuit (1C) communicating with the depressurizing communication hole (1B) and the relief circuit (1C) having an outlet at a position apart from a spanner insertion hole of the plug (2).

In the present invention, it is preferable that a length (L) of a hydrogen gas passage side end portion (2A: a tip portion of a pin) of the plug (2) and a length (HL) of a hydrogen gas passage side end portion (1BA: a small diameter portion) of the depressurizing communication hole are long. Or in the present invention, it is preferable that a rotation stopping pin insertion hole (1D) is formed in the main body portion (1), the rotation stopping pin insertion hole (1D) locating around the plug (2).

With the present invention with the above construction, the depressurizers (10, 11) are mounted to the filling hose (21), so that when the safety joint (20) separates, through the depressurizers (10, 11) can be flown a high pressure hydrogen gas in the filling hose (21) at a small flow rate outside the filling hose (21) (outside the depressurizers 10, 11). Therefore, it is prevented that high pressure hydrogen gas rapidly injects, which prevents the filling hose (21) from moving around (the filling hose (21) becomes uncontrollable).

When the depressurizers (10, 11) according to the present invention include a main body portion (1) in which a hydrogen gas passage (1A) is formed, the main body portion (1) made of metal; a depressurizing communication hole (1B) formed in the main body portion (1), the depressurizing communication hole (1B) communicating with the hydrogen gas passage (1A); and a plug (2) capable of being inserted into the depressurizing communication hole (1B), the plug (2) made of metal, wherein tapered portions (a pin tapered portion 2B of the plug (2), and a tapered portion 1BB of the depressurizing communication hole (1B)) with complementary shapes are formed on the depressurizing communication hole (1B) and the plug (2), a portion where the tapered portion (2B: pin tapered portion) of the plug (2) and the tapered portion (1BB) of the depressurizing communication hole (1B) contact with each other to constitute a metal seal, which completely shuts off high pressure hydrogen gas flowing in the hydrogen gas passage (1A). Then, at the depressurization, when the contact between the tapered portion (2B; pin tapered portion) of the plug (2) and the tapered portion (1BB) of the depressurizing communication hole (1B) is released, a gap formed between an outer periphery of a hydrogen passage side end portion (2A: a pin end portion, diameter φ) of the plug (2) and an inner periphery of a hydrogen passage side end portion (1BA: a small diameter portion, inner diameter d) of the depressurizing communication hole (1B) functions as an orifice (cross section: $(\pi/4)(d^2-\varphi^2)$, annular gap), and the gap decreases pressure of high pressure hydrogen gas flowing in the orifice, so that injection velocity of the hydrogen gas flowing out of the depressurizers (10, 11) becomes low, and it is prevented that the filling hose (21) moves around, that is, the filling hose (21) is prevented from becoming uncontrollable.

In addition, in the present invention, when a relief circuit is formed in the main body portion, the relief circuit communicating with the depressurizing communication hole and the relief circuit having an outlet at a position apart from a spanner insertion hole of the plug, even if a hexagonal rod spanner (S: hexagonal wrench) is inserted into a hexagonal hole formed on an upper portion of the plug (2) (2E: plug hexagonal hole) to rotate the plug (2), and metals are contact with each other to generate sparks, a position where the hydrogen gas flows out of the relief circuit (1C) is apart from a position where the sparks generate, so that a risk that the hydrogen gas ignites by the sparks becomes low, which improves safety of the depressurizers (10, 11)

In the present invention, when a length (L) of a hydrogen passage side end portion (2A: a pin end portion) of the plug (2) and a length (HL) of a hydrogen passage side end portion (1BA: a small diameter portion) of the depressurizing communication hole (1B) are long (FIGS. 2 to 5), even if the hexagonal rod spanner (S: a hexagonal wrench) is inserted into the plug hexagonal hole 2E to excessively rotate the plug (2), there is little possibility that the hydrogen passage side end portion (2A: a pin end portion) of the plug (2) is completely detached from the hydrogen passage side end portion (1BA: a small diameter portion) of the depressurizing communication hole (1B), and through the gap formed between pin end portion 2A and the small diameter portion 1BA flows the hydrogen gas, so that the gap functions as an orifice, and pressure of the high pressure hydrogen gas can be decreased. Therefore, it is not necessary to suppress the excessive rotation of the hexagonal rod spanner (S). On the other hand, in case that the length (L) of the pin end portion 2A is short (FIGS. 6 to 8), forming a rotation stopping pin insertion hole (1D) for suppressing rotation of the hexagonal rod spanner (S) and inserting a rotation stopping pin (P) into rotation stopping pin insertion hole (1D) suppress the excessive rotation of the hexagonal rod spanner (S) when the hexagonal wrench S is inserted into the plug hexagonal hole (2e) to rotate the plug (2). As a result, it is prevented that the pin end portion (2A) is detached from the small diameter portion 1BA, which prevents a cross section of the gap between the pin end portion (2A) and the small diameter portion (1BA) from becoming excessive. Then, it is maintained that the orifice (cross section $(\pi/4)(d^2-\varphi^2)$, annular gap) functions so as to decrease pressure of the high pressure hydrogen gas.

BRIEF DESCRIPTION OF THE DRAWINGS

FIG. 1 is an explanatory view showing an overview according to the first embodiment of the present invention;

FIG. 2 is a cross sectional view of a depressurizer according to the first embodiment;

FIG. 3 shows a view from the arrow A in FIG. 2;

FIG. 4 is a cross sectional view taken along the line B-B in FIG. 3;

FIG. 5 is a cross sectional view taken along the line B-B in FIG. 3 showing a condition that a plug rises to allow a hydrogen gas to flow into a relief circuit from a hydrogen gas passage;

FIG. 6 is a cross sectional view showing a depressurizer according to the second embodiment of the present invention;

FIG. 7 is a cross sectional view showing the depressurizer according to the second embodiment in a condition that a plug rises to allow a hydrogen gas to flow into a relief circuit from a hydrogen gas passage; and FIG. 8 is a perspective view showing the depressurizer according to the second embodiment.

DETAILED DESCRIPTION

Hereinafter, embodiments of the present invention will be explained with reference to attached drawings. At first, the first embodiment of the present invention will be explained with reference to FIGS. 1 to 5. In FIG. 1, to a vehicle side filling port (receptacle) 23 of a hydrogen tank 24 of a vehicle A using hydrogen as fuel is connected a filling nozzle 22. The filling nozzle 22 is mounted on an end of a filling hose 21, and the filling hose 21 is connected to a hydrogen filling apparatus 100. To the filling hose 21 is mounted a safety joint 20, and the safety joint 20 has a function of separating when a tensile load more than a predetermined value is applied to the filling hose 21.

A depressurizer 10 according to the first embodiment is mounted to the filling hose 21 on the side of the vehicle A from a separated safety joint 20. Here, the safety joint 20 has been conventionally known, and at the same time that the safety joint 20 separates a hydrogen gas passage (not shown) is shut off, so that through the separated safety joint 20 does not inject high pressure hydrogen gas. In addition, in the hydrogen filling apparatus 100 is mounted a depressurizing mechanism (not shown), and by the depressurizing mechanism is discharged high pressure hydrogen gas through a region on the hydrogen filling apparatus 100 side from the separated safety joint 20 at a small flow rate, so that on the hydrogen filling apparatus 100 side does not occur an inconvenient condition by injecting the high pressure hydrogen gas (an inconvenient condition that hose is getting out of control, for instance). On the other hand, a high pressure hydrogen gas in the filling hose 21 on the vehicle A side from the separated safety joint 20 is flown through the depressurizer 10 outside the filling hose 21 (outside the depressurizer 10) at a small flow rate. The depressurizer 10 according to the first embodiment will be explained in detail with reference to FIGS. 2 to 5.

In FIG. 2, the depressurizer 10 includes a metal main body portion 1 with a cuboid shape (including a projecting portion 1E described later), and a metal plug 2, and the plug 2 is constituted to engage with (be screwed to) a depressurizing communication hole 1B of the main body portion 1. In FIG. 2, on the left side of the main body portion 1 is formed a projecting portion 1E, and into the projecting portion 1E is inserted the filling hose 21 on the vehicle A side (refer to FIG. 1: filling hose 21 with the filling nozzle 22). On the other hand, in FIG. 2, on the right side of the main body portion 1 is formed a concaved portion 1F, and into the concaved portion 1F is inserted the filling hose 21 on the filling device 100 (refer to FIG. 1) side. Meanwhile, it is possible that the projecting portion 1E is connected to the filling hose 21 on the filling device 100 side and the concaved portion 1F is connected to the filling hose 21 on the vehicle A side. In FIG. 2, at a central portion of main body portion 1 in a vertical direction is formed a hydrogen gas passage 1A, and the hydrogen gas passage 1A communicates the projecting portion 1E with the concaved portion 1F.

In FIG. 2, the depressurizing communication hole 1B communicating with the hydrogen gas passage 1A is formed to extend in a vertical direction. The depressurizing communication hole 1B communicates from an upper surface 1G of the main body portion 1 with the hydrogen gas passage 1A, and with the depressurizing communication hole 1B communicates a relief circuit 1C (refer to FIGS. 4 and 5: not shown in FIG. 2). As described below, cross section of the relief circuit 1C is set to be sufficiently small so as to generate a sufficient pressure loss in a hydrogen gas flowing on the bottom thereof. To the depressurizing communication hole 1B is fitted the plug 2 (though engaging or screwing), and as shown in FIG. 4, engaging the plug 2 with the depressurizing communication hole 1B shuts off the relief circuit 1C from the hydrogen gas passage 1A.

In FIG. 2, the depressurizing communication hole 1B is constituted of: a small diameter portion 1BA communicating with the hydrogen gas passage 1A; a tapered portion 1BB whose diameter is increasing upward from the small diameter portion 1BA; the first middle diameter portion 1BC extending upward from the tapered portion 1BB; the second middle diameter portion 1BD above the first middle diameter portion 1BC; and a female screw portion 1BE communicating with the upper surface 1G. The plug 2 is constituted of: a pin end portion 2A whose diameter at the lower end portion is the smallest, a pin tapered portion 2B whose diameter is increasing upward from the pin end portion 2A; a pin middle diameter portion 2C extending upward from the pin tapered portion 2B, and a male screw portion 2D locating above the pin middle diameter portion 2C and having a male screw on the outer periphery thereof.

When the plug 2 is fitted to the depressurizing communication hole 1B, the pin end portion 2A of the plug 2 is inserted into the small diameter portion 1BA of the depressurizing communication hole 1B. In FIG. 5, diameter of the pin end portion 2A is shown as symbol "φ", and inner diameter of the small diameter portion 1BA of the depressurizing communication hole 1B is shown as symbol "d". Here, the diameter φ of the pin end portion 2A is set to be slightly smaller than the inner diameter d of the small diameter portion 1BA of the depressurizing communication hole 1B (φ<d).

As shown in FIG. 2, the pin tapered portion 2B of the plug 2 and the tapered portion 1BB of the depressurizing communication hole 1B have complementary shapes, and the pin tapered portion 2B of the plug 2 contacts the tapered portion 1BB of the depressurizing communication hole 1B. Here, the both of the plug 2 and the main body portion 1 are made of metal, so that a portion that the pin tapered portion 2B and the tapered portion 1BB contact with each other constitutes a so-called "metal seal". In FIG. 4, the metal seal portion exists near the hydrogen gas passage 1A from the relief circuit 1C. Then, by the metal seal portion that the pin tapered portion 2B of the plug 2 and the tapered portion 1BB of the depressurizing communication hole 1B contact with each other, the relief circuit 1C is completely shut off from the hydrogen gas passage 1A.

In FIG. 2, on the first middle diameter portion 1BC and the second middle diameter portion 1BD of the depressurizing communication hole 1B positions the pin middle diameter portion 2C of the plug 2. Then, between the pin middle diameter portion 2C and the second middle diameter portion 1BD is disposed an O-ring 1H, and the O-ring 1H is disposed on a step portion (shoulder portion) forming a boundary between the first middle diameter portion 1BC and the second middle diameter portion 1BD. The O-ring 1H has a function of preventing high pressure hydrogen gas from injecting upward in FIG. 5 through a gap between the plug 2 and the depressurizing communication hole 1B when the plug 2 sufficiently lifts up from the depressurizing communication hole 1B (a condition that engagement between the plug 2 and the main body portion 1 is released: refer to FIG. 5). In other words, under a condition shown in FIG. 2 (a condition that the plug 2 is screwed to the depressurizing communication hole 1B and engagement therebetween is complete), the O-ring 1H does not perform seal function. Because the metal seal where the pin tapered portion 2B of the plug 2 and the tapered portion 1BB of the depressurizing communication hole 1B contact with each other shuts off high pressure hydrogen gas flowing in the hydrogen gas passage 1A.

As shown FIG. 2, on a region above the depressurizing communication hole 1B is formed the female screw portion 1BE, and to the female screw portion 1BE is screwed the male screw formed on the outer periphery of the male screw portion 2D of the plug 2. In addition, on an upper surface of the plug 2 is formed a hexagonal hole 2E (a plug hexagonal hole). When the plug 2 is attached to/detached from the depressurizing communication hole 1B, as shown in FIG. 8, the hexagonal rod spanner S (a hexagonal wrench) is inserted into the plug hexagonal hole 2E to be rotated. Meanwhile, the arrow C shown in FIG. 8 shows the hydrogen filling apparatus side, and the arrow D shows the vehicle side.

As shown in FIG. 3, on the upper surface 1G of the main body portion 1, around the plug hexagonal hole 2E of the plug 2, rotation stopping pin insertion holes 1D (six holes, for instance) are formed at equal intervals in the circumferential direction. As shown in FIG. 8, for example, under the condition that into one of the rotation stopping pin insertion holes 1D is inserted a rotation stopping pin P, when the hexagonal rod spanner S is inserted into the plug hexagonal hole 2E to be rotated, the rotation stopping pin P interferes with the hexagonal rod spanner S, so that it is prevented that the hexagonal rod spanner S excessively rotates. In case that the hexagonal rod spanner S excessively rotates; the plug 2 is excessively unfasten; and from the small diameter portion 1BA of the depressurizing communication hole B is completely separated the pin end portion 2A of the plug 2, cross section of the gap between the plug 2 and the depressurizing communication hole B becomes excessively large, which does not allow a sufficient pressure loss to be given to the high pressure hydrogen gas. In contrast, when the depressurizer 10 is constituted such that at least one of the rotation stopping pin insertion holes 1D is formed and the rotation stopping pin P interferes with the hexagonal rod spanner S, it is prevented that cross section of the gap between the plug 2 and the depressurizing communication hole 1B becomes excessively large. But, as described below, in the first embodiment shown in FIGS. 1 to 5 can be omitted the rotation stopping pin insertion holes 1D.

As shown in FIGS. 4 and 5, the depressurizing communication hole 1B communicates with the relief circuit 1C in a region near a boundary between the tapered portion 1BB and the first middle diameter portion 1BC. As shown in FIGS. 2 and 4, under a condition the plug 2 is completely screwed to the depressurizing communication hole 1B (a condition that hydrogen is filled without separating the safety joint 20 (FIG. 1), for instance), the pin tapered portion 2B and the tapered portion 1BB of the depressurizing communication hole 1B contact with each other to constitute the metal seal, so that high pressure hydrogen gas flowing in the hydrogen gas passage 1A is completely shut off by the metal seal, and does not flow in the relief circuit 1C.

On the other hand, when the filling hose 21 is depressurized in case that the safety joint 20 separates for example, as shown in FIG. 8, into the plug hexagonal hole 2E is inserted the hexagonal rod spanner S, and rotating the hexagonal rod spanner S in a depressurizing direction (counterclockwise, for instance) releases screwing between the female screw portion 1BE of the depressurizing communication hole 1B and the male screw portion 2D of the plug 2 to lift up the plug 2. By lifting up the plug 2 (unfastening the screwing), the pin tapered portion 2B and the tapered portion 1BB of the depressurizing communication hole 1B are separated from each other to release the metal seal.

A condition that the metal seal is released is shown in FIG. 5. In FIG. 5, the diameter $\varphi$ of the pin end portion 2A is set to be slightly smaller than the inner diameter d of the small diameter portion 1BA of the depressurizing communication hole 1B ($\varphi<d$), and between the outer periphery of the pin end portion 2A and the inner periphery of the small diameter portion 1BA of the depressurizing communication hole 1B is formed an annular gap whose cross section is $(\pi/4)(d^2-\varphi^2)$. At the depressurization, through the annular gap flows a high pressure hydrogen gas filling in the hydrogen gas passage 1A into the relief circuit 1C, and through the relief circuit 1C flows the high pressure hydrogen gas outside the depressurizer 10 (outside the filling hose) as shown by the arrow O. In addition, a hydrogen gas trying to inject upward in FIG. 5 not to flow in the relief circuit 1C is sealed by the O-ring 1H arranged on the second middle diameter portion 1BD.

Here, the difference between the diameter $\varphi$ of the pin end portion 2A and the inner diameter d of the small diameter portion 1BA of the depressurizing communication hole 1B is considerably small, so that the cross section $(\pi/4)(d^2-\varphi^2)$ of the gap (annular gap between the outer periphery of the pin end portion 2A and the inner periphery of the small diameter portion 1BA of the depressurizing communication hole 1B) is much smaller in contrast with the cross section $(\pi/4)d^2$ of the small diameter portion 1BA of the depressurizing communication hole 1B. Therefore, the annular gap whose cross section is $(\pi/4)(d^2-\varphi^2)$ functions as an orifice, and a large pressure loss generates in the high pressure hydrogen gas flowing in the orifice. In addition to that, the cross section of the relief circuit 1C is also small, which causes a pressure loss of the hydrogen gas in the relief circuit 1C also. As a result, injection velocity of the hydrogen gas flowing out of the relief circuit 1C (the arrow O) becomes low, which prevents that the filling hose 21 (FIG. 1) to which the depressurizer 10 is mounted moves around, that is, getting out of control by the hydrogen gas flowing out of the relief circuit 1C.

Here, both of the plug 2 and the hexagonal rod spanner S are made of metal, so that there is a possibility that sparks generate when the hexagonal rod spanner S is inserted into the plug hexagonal hole 2E to be rotated. In addition, when the rotation stopping pin P shown in FIG. 8 is mounted, there is a possibility that sparks generate when the hexagonal rod spanner S contacts the rotation stopping pin P. In contrast, in the first embodiment, as clearly shown in FIGS. 4 and 5 is formed a hydrogen gas outlet of the relief circuit 1C at a position apart from the plug hexagonal hole 2E. As a result, a position where a hydrogen gas flows out of the relief circuit 1C is apart from a position where sparks generate by contacting metals with each other (the upper surface 1G of the main body portion 1), so that there is little possibility that flammable hydrogen gas ignites through the sparks, and it is safe around the depressurizer 10.

In the first embodiment, as shown in FIG. 4 for example, when the plug 2 is completely screwed to the depressurizing communication hole 1B, the length L of the pin end portion 2A (a vertical length in FIG. 4) and the length HL of the small diameter portion 1BA of the depressurizing communication hole 1B (vertical length in FIG. 4) are comparatively long, and the insertion length LW (a vertical length shown in FIG. 4) of the pin end portion 2A into the small diameter portion 1BA of the depressurizing communication hole 1B is comparatively long also. Therefore, when into the plug hexagonal hole 2E is inserted the hexagonal rod spanner S to be rotated, even if the hexagonal rod spanner S is excessively rotated, there is little possibility that from the small diameter portion 1BA of the depressurizing communication hole 1B is completely detached the pin end portion 2A, so that a condition that the hydrogen gas flows through the annular gap between the small diameter portion 1BA and the pin end portion 2A, that is, the gap whose cross section is $(\pi/4)(d^2-\varphi^2)$ is maintained, and the annular gap functions as an orifice, and a pressure loss can be given to the high pressure hydrogen gas. Therefore, in the first embodiment, it is unnecessary to suppress the excessive rotation of the hexagonal rod spanner S, and the rotation stopping pin P and the rotation stopping pin insertion hole 1D can be omitted.

With the first embodiment shown in FIGS. 1 to 5, the depressurizer 10 is mounted to the filling hose 21, and under a condition that the main body portion 1 and the plug 2 engage with each other, the portion that the pin tapered portion 2B and the tapered portion 1BB of the depressurizing communication hole 1B contact with each other to constitute a metal seal, so that it can be completely shut off that the high pressure hydrogen gas flowing in the hydrogen gas passage 1A flows into the depressurizing communication hole 1B. At the depressurization, when the engagement between the plug 2 and the depressurizing communication hole 1B is released, the gap (cross section $(\pi/4)(d^2-\varphi^2)$, annular gap) formed between the outer periphery of the hydrogen passage side end portion 2A (pin end portion) of the plug 2 and the inner periphery of the hydrogen passage side end portion 1BA (small diameter portion) of the depressurizing communication hole 1B functions as an orifice, so that a pressure loss generates in the high pressure hydrogen gas flowing in the orifice. Further, since the cross section of the relief circuit 1C is small, when the hydrogen gas flows in the relief circuit 1C, a pressure loss generates in the hydrogen gas. Then, injection velocity of the hydrogen gas (the arrow O shown in FIG. 5) flowing out of the depressurizer 10 (relief circuit 1C) becomes slow to prevent the filling hose 21 to which the depressurizer 10 is mounted from moving around, that is, getting out of control.

In addition, in the first embodiment, since the hydrogen gas outlet of the relief circuit 1C is formed at a position apart from the area above the plug 2, even if sparks generate when into the plug hexagonal hole 2E is inserted the hexagonal rod spanner S, a position where flammable hydrogen gas flows out (the arrow O shown in FIG. 5) is separated from a position where sparks generate, so that there is little possibility that hydrogen gas ignites due to the sparks, and it is safe around the depressurizer 10.

Further, in the first embodiment, since the length L of the pin end portion 2A of the plug 2 and the length HL of the small diameter portion 1BA of the depressurizing communication hole 1B are long, even if into the plug hexagonal hole 2E above the plug is inserted the hexagonal rod spanner S to be rotated excessively, there is little possibility that the pin end portion 2A of the plug 2 completely detaches from the small diameter portion 1BA of the depressurizing communication hole 1B, and the gap between the pin end portion 2A of the plug 2 and the small diameter portion 1BA of the depressurizing communication hole 1B (cross section $(\pi/4)(d^2-\varphi^2)$, annular gap) is maintained, and by the function of the gap as an orifice, a pressure loss generates in the hydrogen gas. Therefore, excessively rotating the hexagonal rod spanner S does not cause any inconvenience, and it is unnecessary to mount the rotation stopping pin insertion hole 1D on the main body portion 1 of the depressurizer 10, in addition, there is no need to insert the rotation stopping pin P thereto.

In addition, in the first embodiment shown in the drawings, between the pin middle diameter portion 2C of the plug 2 and the second middle diameter portion 1BD of the depressurizing communication hole 1B is arranged the O-ring 1H. When the engagement between the plug 2 and the depressurizing communication hole 1B is released (refer to FIG. 5), even if a high pressure hydrogen gas tries to inject from the gap between the plug 2 and the depressurizing communication hole 1B upward in FIG. 5 without flowing in the relief circuit 1C, it can be prevented by the O-ring 1H.

Next, the second embodiment of the present invention will be explained with reference to FIGS. 6 to 8. In a depressurizer 11 according to the second embodiment, as clearly shown in FIGS. 6 and 7, the length L (a vertical length in FIG. 7) of the pin end portion 2A of the plug 2 is clearly shorter than that shown in FIG. 4 (in the first embodiment), and the insertion length LW (a vertical length in FIG. 6) of the pin end portion 2A into the small diameter portion 1BA is also shorter. At a depressurization shown in FIG. 7, when into the plug hexagonal hole 2E is inserted the hexagonal rod spanner S to be excessively rotated, from the small diameter portion 1BA of the depressurizing communication hole 1B completely detaches the pin end portion 2A of the plug 2, and the cross section of the gap between the depressurizing communication hole B and the plug 2 enlarges, which does not function as an orifice. As a result, pressure loss generating in the high pressure hydrogen gas that remains in the hydrogen gas passage 1A becomes small, which causes velocity of the high pressure hydrogen gas flowing out of the relief circuit 1C to be high.

Then, in the second embodiment, as shown in FIG. 8, it is essential that on the upper surface 1G of the main body portion 1 is formed the rotation stopping pin insertion hole 1D to insert the rotation stopping pin P for suppressing rotation of the hexagonal rod spanner S. In other words, by the rotation stopping pin P is suppressed an excessive rotation of the hexagonal rod spanner S, and the gap between the pin end portion 2A of the plug 2 and the small diameter portion 1BA of the depressurizing communication hole 1B is maintained as an annular one whose cross section is $(\pi/4)(d^2-\varphi^2)$, and the gap provides a function of generating a pressure loss in hydrogen gas as an orifice. Not illustrated, in addition to the length L (a vertical length in FIG. 7) of the pin end portion 2A of the plug 2, the length HL (a vertical length in FIG. 7) of the small diameter portion 1BA of the depressurizing communication hole 1B can be set to be short, and in this case, it is essential that the rotation stopping pin insertion hole 1D is formed to insert the rotation stopping pin P thereto.

In FIGS. 6 and 7, to members corresponding to those shown in FIGS. 1 to 5 are attached the same numerals as those in FIGS. 1 to 5. Other construction and action effect of the second embodiment shown in FIGS. 6 to 8 are the same as those of the first embodiment.

Since the embodiments shown in the drawings are merely examples, and the embodiments do not limit the technical scope of the present invention.

DESCRIPTION OF THE REFERENCE NUMERALS

1 main body portion (of depressurizer)
1A hydrogen gas passage
1B depressurizing communication hole
1BA small diameter portion
1BB tapered portion
1C relief circuit
1D rotation stopping pin insertion hole
2 plug
2A pin end portion
2B pin tapered portion
10, 11 depressurizers
20 safety joint
21 filling hose
100 hydrogen filing apparatus
HL length of small diameter portion of depressurizing communication hole
L length of pin end portion of plug
LW insertion length of pin end portion into small diameter portion
P rotation stopping pin
S hexagonal rod spanner

What is claimed is:

1. A depressurizer mountable to a filling hose for filling hydrogen from a hydrogen filling apparatus to a vehicle, the depressurizer comprising:
   a main body portion in which a hydrogen gas passage is formed, said main body portion made of metal and including a relief circuit and a tapered depressurizing communication hole formed therein, said tapered depressurizing communication hole communicating with the hydrogen gas passage and having a tapered wall extending between the hydrogen gas passage and the relief circuit; and
   a plug capable of being inserted into the depressurizing communication hole, said plug made of metal and being tapered and complementary in shape to the tapered depressurizing communication hole.

2. The depressurizer as claimed in claim 1, the relief circuit having an outlet at a position apart from a spanner insertion hole of the plug.

3. The depressurizer as claimed in claim 1 further comprising a rotation stopping pin insertion hole formed in the main body portion, said rotation stopping pin insertion hole locating around the plug.

4. The depressurizer as claimed in claim 2 further comprising a rotation stopping pin insertion hole formed in the main body portion, said rotation stopping pin insertion hole locating around the plug.

5. The depressurizer as claimed in claim 4, further comprising a rotation stopping pin insertable within the rotation stopping pin insertion hole.

6. The depressurizer as claimed in claim 1, wherein the relief circuit is offset from the depressurizing communication hole.

7. The depressurizer as claimed in claim 6, wherein the depressurizing communication hole extends along a first axis and the relief circuit extends along a second axis perpendicular to the first axis.

8. The depressurizer as claimed in claim 1, wherein the plug includes a pin end portion that is of a cylindrical configuration, and a tapered portion extending from the pin end portion.

9. The depressurizer as recited in claim 8, wherein the plug further includes a shoulder extending outwardly between the pin end portion and the tapered portion.

* * * * *